Patented Feb. 4, 1930

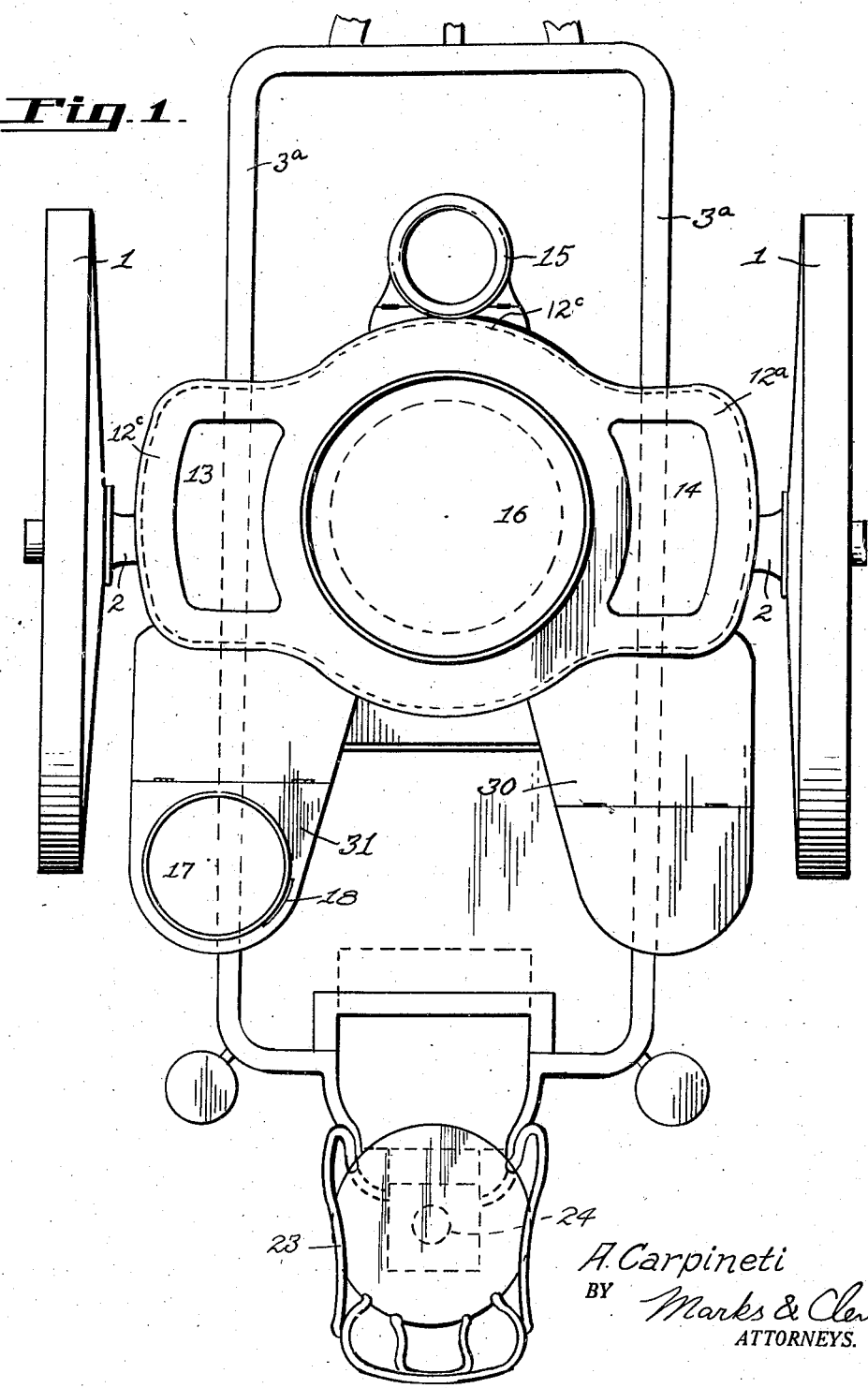

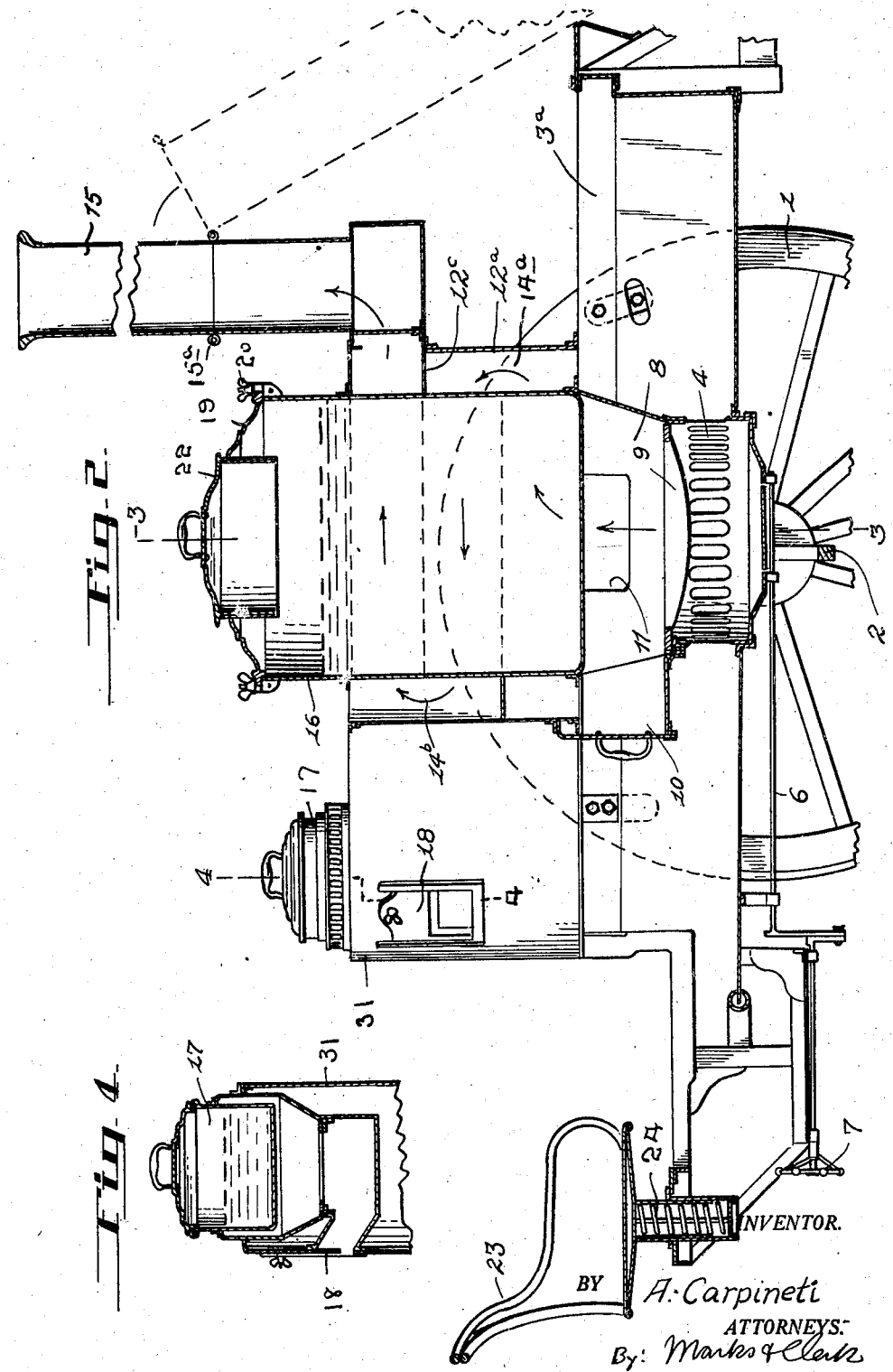

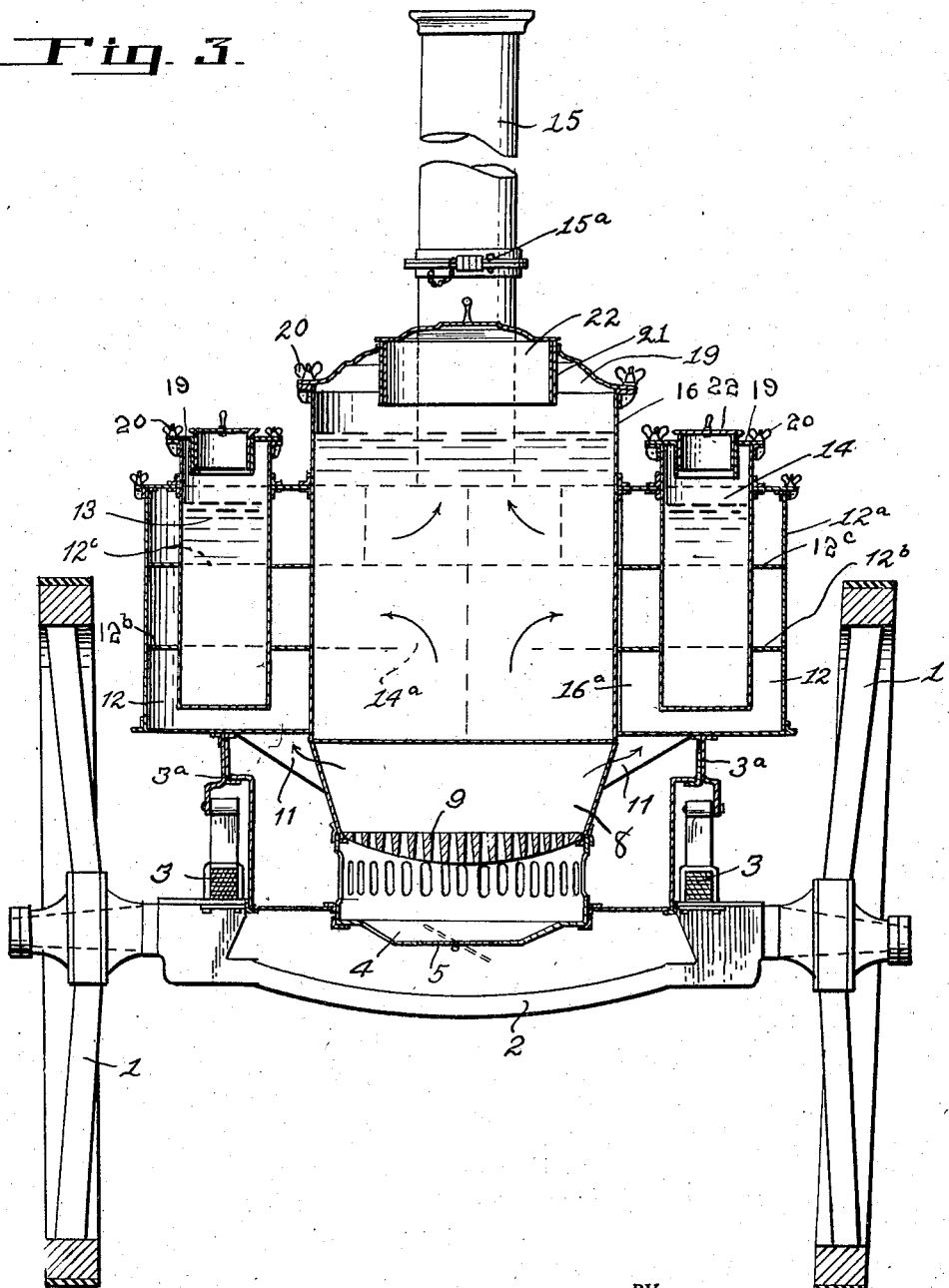

1,745,980

UNITED STATES PATENT OFFICE

ARNALDO CARPINETI, OF BUENOS AIRES, ARGENTINA

ARMY TRAVELING KITCHEN

Application filed July 8, 1926. Serial No. 121,224.

This invention relates to improvements in portable kitchens, and has for its object to provide an arrangement of this character which is especially adapted for use in the preparation of foods for the army.

The object of the invention is the provision of a portable kitchen which utilizes to a high degree the heated products of combustion rising from the combustion chamber in the heating of a group of cooking vessels arranged above said chamber.

A further object is the provision and arrangement of baffles in the heating chamber which control the circulation of the ascending products of combustion and cause the latter to impinge upon and effectively heat a plurality of cooking vessels.

In the accompanying drawing wherein an improved embodiment of the invention is illustrated, Fig. 1 is a top plan view of the portable kitchen;

Fig. 2 is diagrammatic longitudinal sectional view thereof, partly in elevation;
Fig. 3 is a vertical section on the line 3—3 of Fig. 2;

Fig. 4 is a detail section on the line 4—4 of Fig. 2.

Referring to the drawing in detail the axle 2 mounted for transportation on wheels 1 supports the springs 3 on which the frame $3^a$ is mounted. The ash pit 4 is mounted in the frame $3^a$ and is provided in the bottom with a sliding door 5 connected by a rod 6 with an operating handle 7. The fire and combustion chamber 8 is located above the ash pit 4 and separated therefrom by grate bars 9 on which the fuel is supported during combustion and a suitable door 10 is provided for facilitating the introduction of fuel.

The hollow body $12^a$ of the cooking apparatus is provided with the internal heating chamber 12 in which is located the relatively large and centrally located cooking vessel 16 disposed directly over the combustion chamber 8. The hollow body $12^a$ is provided with lateral enlargements accommodating the lateral cooking vessels 13 and 14 disposed on opposite sides of and of smaller dimensions than the vessel 16. The several vessels 13, 14 and 16 project above the top of the body $12^a$, while the lateral vessels 13 and 14 terminate above the bottom of said body so as to provide for the free circulation of the products of combustion rising from the outwardly inclined flues 11 which connect the chamber 8 with the lateral portions of the body $12^a$.

The central vessel 16, as well as the two lateral vessels 13 and 14, are provided each with a cover 19 secured in position by nuts 20 fitted on screws pivoted to the vessel and provided with a central opening 21 accommodating a smaller supplementary cover 22 which extends a considerable distance within the interior of the vessel.

Two baffles $12^b$ and $12^c$ are located in the heating chamber $12^a$, the lower baffle $12^b$ being disposed horizontally and entirely closing the space between the exterior of the central vessel 16 and the side walls of the body $12^a$ except for the passage $14^a$ in the baffle located adjacent the front of the portable kitchen. The baffle $12^c$ is of substantially the same shape as the baffle $12^b$ which is oppositely arranged so as to provide a passage $14^b$ between the vessel 16 and the wall of the body $12^a$ at a point diametrically opposite the passage $14^a$.

The heating chamber 12 communicates in a plane above the baffle $12^c$ with a chimney 15 preferably provided with a hinged joint $15^a$ permitting the upper terminal thereof to be folded downwardly for facility in transportation.

According to the arrangement of the baffles the heated products of combustion rising from the chamber 8 pass through the flues 11 and, circulating about the sides of the center vessel 16 and the sides and bottoms of the lateral vessels 13 and 14, pass through the opening $14^a$ into the space between the baffles $12^b$ and $12^c$, and passing rearwardly as indicated by the arrows in Fig. 2, they can impinge the walls of the vessels 13, 14 and 16, and entering the space above the baffle $12^c$, are finally discharged from the chimney 15. The gases arising from the heating chamber are thus caused to pass forwardly and rearwardly in horizontal planes across the surfaces of the several vessels 13, 14 and 16 which latter are effectively heated while the bottom of the center vessel is directly exposed to the fire and combustion chamber 8, and for which latter it constitutes the top wall.

The body 12ª is provided with rear extensions 30 and 31, the extension 30 being adapted to receive fuel for use in the operation of the portable kitchen and the other extension being provided with an auxiliary cooking vessel 17 having a sliding door 18 associated therewith.

A seat 23 for the attendant is provided at the rear of the frame 3ª and is resiliently supported on a spring 24.

What I claim as my invention and desire to secure by Letters Patent, is:

1. In a portable kitchen, a combustion chamber, a heating chamber, central and lateral cooking vessels depending into the heating chamber, the bottom of the central vessel directly overlying and forming the top of the combustion chamber, flues connecting the combustion chamber with the heating chamber, means permitting the escape of the products of combustion from the heating chamber, and horizontally disposed baffle means partially surrounding the central vessel for causing the products of combustion rising within the heating chamber to be divided and circulate about the opposite sides of the central vessel in a zig-zag path, first in one direction and then in the other direction, the lateral cooking vessels being arranged laterally of the central vessel and passing through said baffle means, the products of combustion traversing the last mentioned vessels, first in one direction and then in the other direction.

2. In a portable kitchen, a combustion chamber, a heating chamber, a central cylindrical cooking vessel arranged in the heating chamber, the bottom of the central vessel directly overlying and forming the top of the combustion chamber, flues connecting the combustion chamber with the heating chamber at opposite sides of the cooking vessel, substantially annular baffle members partially surrounding said vessel for causing the products of combustion rising in the heating chamber to pass about the cooking vessel in a zig-zag path first in one direction and then in the other, and means permitting the escape of the products of combustion from the heating chamber.

3. In a portable kitchen, a combustion chamber, a heating chamber having opposed laterally enlarged portions, a central cooking vessel arranged in the heating chamber, the bottom of the central vessel directly overlying and forming the top of the combustion chamber, flues connecting the combustion chamber with the heating chamber at opposite sides of the cooking vessel, vertically superposed baffles partially surrounding said vessel for causing the products of combustion rising in the heating chamber to pass about the cooking vessel in a zig-zag path first in one direction and then in the other, and means permitting the escape of the products of combustion from the heating chamber, and additional cooking vessels located in the laterally enlarged portions of the heating chamber, said additional cooking vessels passing through said baffles and subjected to the heating effect of the products of combustion passing therebetween and arranged in the path of the products of combustion rising through said flues.

In testimony whereof I affix my signature.

ARNALDO CARPINETI.